United States Patent
Terada et al.

(10) Patent No.: US 10,099,727 B2
(45) Date of Patent: Oct. 16, 2018

(54) VEHICLE PILLAR STRUCTURE

(71) Applicant: TOYOTA JIDOSHA KABUSHIKI KAISHA, Toyota-shi (JP)

(72) Inventors: Shin Terada, Toyota (JP); Yoshinori Yamada, Nagakute (JP); Chikashi Takeichi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/401,632

(22) Filed: Jan. 9, 2017

(65) Prior Publication Data

US 2017/0240210 A1    Aug. 24, 2017

(30) Foreign Application Priority Data

Feb. 24, 2016   (JP) .................. 2016-033480

(51) Int. Cl.
| | |
|---|---|
| B60J 7/00 | (2006.01) |
| B62D 25/04 | (2006.01) |
| B62D 21/15 | (2006.01) |
| B62D 29/04 | (2006.01) |

(52) U.S. Cl.
CPC ........... B62D 25/04 (2013.01); B62D 21/152 (2013.01); B62D 29/043 (2013.01); *B60Y 2304/03* (2013.01); *B60Y 2306/01* (2013.01)

(58) Field of Classification Search
CPC .... B61D 7/00; H01M 10/0525; H01M 4/133; H01M 4/364; H01M 4/366; B60R 21/213; B60R 21/232; B60R 2021/0006; B60R 2021/23386; B60R 21/2176

USPC .................................................... 296/193.06
See application file for complete search history.

(56) References Cited

U.S. PATENT DOCUMENTS

| | | | | |
|---|---|---|---|---|
| 5,609,385 | A | * | 3/1997 | Daniel ................ B60R 13/0206 280/751 |
| 5,709,407 | A | * | 1/1998 | Stephens ............... B60R 13/025 280/751 |
| 5,720,510 | A | * | 2/1998 | Daniel ................ B60R 13/0206 280/751 |
| 6,095,593 | A | * | 8/2000 | Johann .................... B60R 13/02 280/751 |

(Continued)

FOREIGN PATENT DOCUMENTS

| | | |
|---|---|---|
| EP | 1 870 318 A1 | 12/2007 |
| JP | 2013-75661 | 4/2013 |

(Continued)

*Primary Examiner* — Kiran B Patel
(74) *Attorney, Agent, or Firm* — Oblon, McClelland, Maier & Neustadt, L.L.P.

(57) ABSTRACT

A vehicle pillar structure comprising a pillar portion extending in parallel with an outer end portion of a windshield and the pillar portion having a hollow structure, the pillar portion comprising an outer side wall at a vehicle exterior side of the pillar portion; an inner side wall at a vehicle cabin side of the pillar portion; and a pair of side walls linking the outer side wall and the inner side wall. At least a portion of the outer side wall is an outer side transparent portion, at least a portion of the inner side wall is an inner side transparent portion and, as viewed from a driver position, overlaps with the outer side transparent portion, and a tensile strength of the outer side wall is lower than that of the inner side wall.

5 Claims, 8 Drawing Sheets

(56) References Cited

U.S. PATENT DOCUMENTS

| | | | | |
|---|---|---|---|---|
| 6,390,539 B2* | 5/2002 | Takahara | ................ | B60R 21/04 |
| | | | | 280/748 |
| 7,168,756 B2* | 1/2007 | Hasegawa | ............... | B62D 25/04 |
| | | | | 296/203.03 |
| 7,360,825 B2* | 4/2008 | Yoshioka | ................ | B60J 10/25 |
| | | | | 296/203.03 |
| 7,690,676 B2* | 4/2010 | Jaramillo | ................ | B60R 13/025 |
| | | | | 280/728.2 |
| 2002/0171263 A1* | 11/2002 | Frasher | ................... | B60R 21/04 |
| | | | | 296/203.02 |
| 2008/0143149 A1* | 6/2008 | Lee | ........................ | B62D 25/04 |
| | | | | 296/203.02 |
| 2010/0320796 A1* | 12/2010 | Hoefer | ................... | B60R 13/07 |
| | | | | 296/93 |
| 2015/0002642 A1* | 1/2015 | Dressler | ................... | B60R 1/00 |
| | | | | 348/51 |
| 2015/0151796 A1* | 6/2015 | Berger | ................... | B29C 70/68 |
| | | | | 296/193.06 |
| 2017/0183039 A1* | 6/2017 | Toyota | ................ | B62D 21/152 |
| 2017/0239883 A1* | 8/2017 | Terada | ................... | B33Y 10/00 |
| 2017/0240122 A1* | 8/2017 | Terada | .................... | B60R 13/08 |
| 2017/0240211 A1* | 8/2017 | Terada | .................... | B60J 1/006 |
| 2017/0253275 A1* | 9/2017 | Terada | ................... | B62D 29/04 |
| 2017/0297509 A1* | 10/2017 | Shami | ........................ | B60J 1/02 |
| 2017/0327153 A1* | 11/2017 | Kim | ........................ | B62D 25/04 |

FOREIGN PATENT DOCUMENTS

| | | |
|---|---|---|
| JP | 2014-207326 | 10/2014 |
| JP | 2017-114410 A | 6/2017 |

* cited by examiner

VEHICLE PILLAR STRUCTURE

CROSS-REFERENCE TO RELATED APPLICATION

This application claims priority under 35 USC 119 from Japanese Patent Application No. 2016-33480 filed on Feb. 24, 2016, the disclosure of which is incorporated by reference herein in its entirety.

BACKGROUND

Technical Field

Preferred embodiments relate to a vehicle pillar structure.

Related Art

In a front pillar described in Japanese Patent Application Publication (JP-A) No. 2013-75661, the front pillar is formed from a transparent resin material. Accordingly, the driver is able to view a vehicle exterior side through the front pillar.

SUMMARY

However, because the aforementioned front pillar is a solid structure, the mass of the front pillar increases. To counter this, it is possible to achieve a reduction in the weight of the front pillar by, for example, forming the front pillar as a hollow structure. In this case, there is a possibility that the strength of the entire front pillar will be reduced. Because of this, for example, in the event of a vehicle frontal collision, there is a possibility that, if the front pillar were to bend and break, the vehicle occupant protection performance would be reduced.

In consideration of the above circumstances, an object of preferred embodiments is to provide a vehicle pillar structure that enables a superior vehicle occupant protection performance to be secured while achieving visibility for a driver through a pillar, and achieving a reduction in weight.

A vehicle pillar structure of a first aspect of the disclosure includes a pillar portion that extends in parallel with a vehicle transverse direction outer side end portion of a windshield glass and that has a hollow structure. The pillar portion includes an outer side wall forming a wall at a vehicle exterior side of the pillar portion, an inner side wall forming a wall at a vehicle cabin side of the pillar portion, and a pair of side walls linking the outer side wall and the inner side wall. At least a portion of the outer side wall is an outer side transparent portion that is formed from a transparent resin, and at least a portion of the inner side wall is an inner side transparent portion that is formed from a transparent resin and, as viewed from a driver position, the inner side transparent portion is disposed such that it overlaps with the outer side transparent portion. A tensile strength of the outer side wall is lower than a tensile strength of the inner side wall.

In the vehicle pillar structure according to the first aspect, the pillar portion extends in parallel with a vehicle transverse direction outer side end portion of the windshield glass, and the pillar portion is formed as a hollow structure. As a consequence, compared with when the pillar portion is formed as a solid structure, a reduction in the weight of the pillar portion can be achieved.

Moreover, the pillar portion is formed so as to include an outer side wall at a vehicle exterior side of the pillar portion, an inner side wall at a vehicle cabin side of the pillar portion, and a pair of side walls that link together the outer side wall and the inner side wall. Furthermore, at least a portion of the outer side wall is an outer side transparent portion that is formed from a transparent resin, and at least a portion of the inner side wall is an inner side transparent portion that is formed from a transparent resin and, as viewed from a driver position, the inner side transparent portion is disposed such that it overlaps with the outer side transparent portion. As a consequence, the driver is able to view the vehicle exterior side through the outer side transparent portion and the inner side transparent portion of the pillar portion.

In the event of a vehicle frontal collision, a collision load towards a vehicle rear side is input from a front end portion of that pillar portion that is disposed at a front portion of the vehicle cabin. As a consequence, the front end portion of the pillar portion is displaced towards the vehicle rear side, and this causes an intermediate portion in the longitudinal direction of the pillar portion to bend such that it protrudes towards the vehicle exterior side. Moreover, in the event of a vehicle rear surface collision, a collision load towards a vehicle front side is input from a rear end portion of that pillar portion that is disposed at a rear portion of the vehicle cabin. As a consequence, the rear end portion of the pillar portion is displaced towards the vehicle front side, and this causes an intermediate portion in the longitudinal direction of the pillar portion to bend such that it protrudes towards the vehicle exterior side. Accordingly, in the event of either a vehicle front surface collision or a vehicle rear surface collision, tensile force acts on the outer side wall of the pillar portion, and compressive force acts on the inner side wall of the pillar portion.

Here, the tensile strength of the outer side wall is set lower than the tensile strength of the inner side wall. In addition, as is described above, during either a vehicle frontal collision or a vehicle rear surface collision, tensile force acts on the outer side wall, and compressive force acts on the inner side wall of the pillar portion. Because of this, during either a vehicle frontal collision or a vehicle rear surface collision, it is possible to make the outer side wall easier to bend and to make the inner side wall more difficult to bend in response to the forces acting on the pillar portion. As a result, because, primarily, the outer side wall is bent while the bending of the inner side wall is reduced or prevented, any breaking of the entire pillar portion is prevented. Moreover, because the bending of the inner side wall that forms the vehicle cabin interior side of the pillar portion is reduced or prevented, it is possible to secure an excellent protection performance for a vehicle occupant inside the vehicle cabin. As a result of the above, it is possible to ensure a superior vehicle occupant protection performance while also achieving visibility for a driver through a pillar, and achieving a reduction in weight.

A vehicle pillar structure of a second aspect of the disclosure includes the first aspect, and the outer side transparent portion and the inner side transparent portion are formed from glass fiber-reinforced resin, and the glass fiber content in the glass fiber-reinforced resin forming the outer side transparent portion is less than the glass fiber content in the glass fiber-reinforced resin forming the inner side transparent portion.

In the vehicle pillar structure according to the second aspect, the transparent resin that is used to form the outer side transparent portion and the inner side transparent portion is a glass fiber-reinforced resin. Because of this, it is possible to increase the tensile strength of the entire pillar portion. Moreover, a glass fiber content in the glass fiber-reinforced resin forming the outer side transparent portion is less than a glass fiber content in the glass fiber-reinforced resin forming the inner side transparent portion. Because of this, the tensile strength of the outer side wall can be set lower than the tensile strength of the inner side wall by means of a simple structure.

A vehicle pillar structure of a third aspect of the disclosure includes the first aspect or the second aspect, and a low-strength portion having lower tensile strength than other portions of the outer side wall is provided at an upper portion in a pillar portion longitudinal direction of the outer side wall.

In the vehicle pillar structure according to the third aspect, a low-strength portion is provided at an upper portion of the outer side wall in the longitudinal direction of the pillar portion and the tensile strength of the low-strength portion is lower than the tensile strength of other portions of the outer side wall. Because of this, in the pillar portion that is disposed in a front portion of a vehicle cabin, it is possible to improve the protection performance for the head portion of a vehicle occupant in an offset collision or in a small overlap collision from the vehicle front side.

Namely, because the tensile strength of the low-strength portion is lower than the tensile strength of portions other than the low-strength portion of the outer side wall, in an offset collision or a small overlap collision, the outer side wall is made to bend with the low-strength portion as a bend starting point. As a consequence, in the pillar portion, peripheral portions surrounding the low-strength portion are liable to bend such that they protrude towards the vehicle exterior side.

In an offset collision or a small overlap collision, because of inertial force, the upper body portion of a vehicle occupant moves towards the vehicle front side and towards the outer side in the vehicle transverse direction on the side of the collision. Namely, the head portion of the vehicle occupant who is sitting in the vehicle seat on the side where the collision occurs moves towards the pillar portion that is disposed in the front portion of the vehicle cabin. At this time, as is described above, in the pillar portion, peripheral portions surrounding the low-strength portion bend such that they protrude towards the vehicle exterior side. The low-strength portion is provided at an upper portion of the pillar portion. Namely, the position of the low-strength portion in the vehicle up-down direction can be set to match the position of the head portion of the vehicle occupant. As a consequence, during an offset collision or a small overlap collision, the pillar portion can be made to move away from the head portion of the vehicle occupant which is moving towards the front side and towards the outer side in the vehicle transverse direction. As a result, any collision between the head portion of a vehicle occupant and the pillar portion can be reduced or prevented. Accordingly, it is possible to improve the protection performance for the head portion of a vehicle occupant in an offset collision and in a small overlap collision. Note that the upper portion of the pillar portion refers to a portion extending from a central portion to the upper end side in the longitudinal direction of the pillar portion.

A vehicle pillar structure of a fourth aspect of the disclosure includes any one of the first aspect to the third aspect, and plural outer side beams that are suspended between the pair of side walls are formed integrally with the outer side wall, and plural inner side beams that are suspended between the pair of side walls are formed integrally with the inner side wall. The outer side beams and the inner side beams are formed from carbon fiber-reinforced resin, and cross-sectional shapes of the outer side beams and the inner side beams are identical, while a number of the outer side beams is fewer than a number of the inner side beams.

In the vehicle pillar structure according to the fourth aspect, plural outer side beams are formed integrally with the outer side wall, and the outer side beams are suspended between the pair of side walls of the pillar portion. Moreover, plural inner side beams are formed integrally with the inner side wall, and the inner side beams are suspended between the pair of side walls of the pillar portion. Furthermore, the outer side beams and the inner side beams are formed from carbon fiber-reinforced resin. As a consequence, the flexural strength of the pillar portion overall can be set higher due to the outer side beams and the inner side beams.

Moreover, the cross-sectional shapes of the outer side beams and the inner side beams are the same, while a number of the outer side beams is fewer than a number of the inner side beams. Because of this, it is possible to set the flexural strength of the outer side wall to less than the flexural strength of the inner side wall while increasing the flexural strength of the pillar portion overall. As a consequence, in a vehicle frontal collision or rear surface collision, it is possible to increase the overall flexural strength of the pillar portion by means of the outer side beams and inner side beams, while maintaining a structure in the pillar portion in which the outer side walls bend easily while the inner side walls only bend with difficulty.

A vehicle pillar structure of a fifth aspect of the disclosure includes the fourth aspect, and the outer side beams are formed so as to include first outer side beams, and second outer side beams that, when seen in a vehicle side view, extend in directions that intersect with the first outer side beams, and the inner side beams are formed so as to include first inner side beams, and second inner side beams that, when seen in a vehicle side view, extend in directions that intersect with the first inner side beams. A length of the respective first outer side beams is set longer than a length of each of the second outer side beams, the first inner side beams, and the second inner side beams.

In the vehicle pillar structure according to the fifth aspect, the length of the respective first outer side beams is set longer than the length of each of the second outer side beams, the first inner side beams, and the second inner side beams. Because of this, compared to the second outer side beams, the first inner side beams, and the second inner side beams, the first outer side beams can be disposed in parallel with the longitudinal direction of the pillar portion. As a consequence, the first outer side beams can be arranged such that tensile force resistance properties of the first outer side beams can be utilized effectively with respect to tensile force that is applied to the outer side wall in the event of a frontal collision or a rear side collision. As a consequence, it is possible to reduce or prevent any extreme bending of the outer side wall in the event of a frontal collision or rear side collision.

BRIEF DESCRIPTION OF THE DRAWINGS

Preferred embodiments will be described in detail based on the following figures, wherein.

DETAILED DESCRIPTION

First embodiment

Hereinafter, a vehicle pillar structure S1 according to a first exemplary embodiment will be described using FIG. 1 through FIG. 6. Note that an arrow FR, an arrow UP, and an arrow RH that are shown where appropriate in the drawings respectively indicate a vehicle front side, a vehicle upper side, and a vehicle right-hand side of a vehicle (i.e., an automobile) V that is provided with a front pillar 30 to which the vehicle pillar structure S1 has been applied. Moreover, if simple front-rear, up-down, or left-right directions are used in the following description, then, unless specifically stated otherwise, these refer respectively to the front-rear directions of the vehicle, the up-down directions of the vehicle, and the left-right directions of the vehicle (i.e., the vehicle transverse direction).

Figure 2:
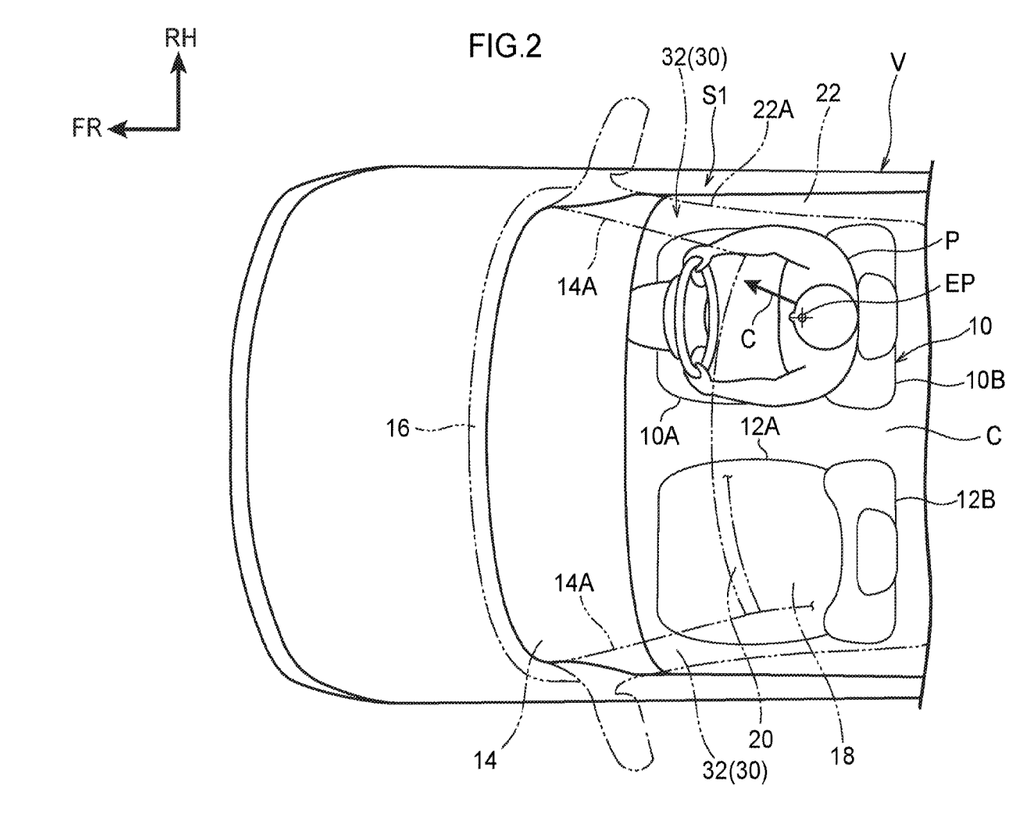
FIG. 2 is a schematic plan view showing a front portion of a cabin interior of a vehicle provided with the front pillar shown in FIG. 1.

Hereinafter, a schematic structure of the vehicle V will firstly be described. In FIG. 2, a front portion of an interior of a cabin C of the vehicle V is shown in a plan view. As is shown in this drawing, a vehicle seat 10 for a driver is disposed on a right-side of the front portion of the vehicle cabin C. The vehicle seat 10 is constructed so as to include a seat cushion 10A on which a vehicle occupant P (hereinafter, referred to as a 'driver P') sits, and a seat back 10B that supports a back portion of the driver P. A bottom end portion of the seat back 10B is linked to a rear end portion of the seat cushion 10A.

A vehicle seat 12 for a passenger is disposed on a left-side of the front portion of the vehicle cabin C. In the same way as the vehicle seat 10, the vehicle seat 12 is constructed so as to include a seat cushion 12A, and a seat back 12B. From the above description it can be seen that the vehicle V is a right-hand drive vehicle.

A windshield glass 14 is provided at the front end of the cabin C of the vehicle V. The windshield glass 14 is formed in a transparent plate shape and, when seen in a side view, is disposed such that it slopes towards the rear as it moves upwards (see FIG. 3). A central portion in the vehicle transverse direction of the windshield glass 14 is formed in a curved shape that bulges slightly towards the front side. Vehicle transverse direction outer side end portions 14A of the windshield glass 14 are held by pillar portions 32 of front pillars 30 (described below). A bottom end portion of the windshield glass 14 is fixed by means of an adhesive agent (not shown in the drawings) to a cowl 16 that extends in the vehicle transverse direction. The cowl 16 is disposed along a top end portion of a dash panel (not shown in the drawings) that forms a front portion of the cabin C. A top end portion of the windshield glass 14 is fixed by means of an adhesive agent (not shown in the drawings) to a front header 20 that is arranged in the vehicle transverse direction at a front end portion of a roof 18 that forms an upper portion of the cabin C.

Figure 3:
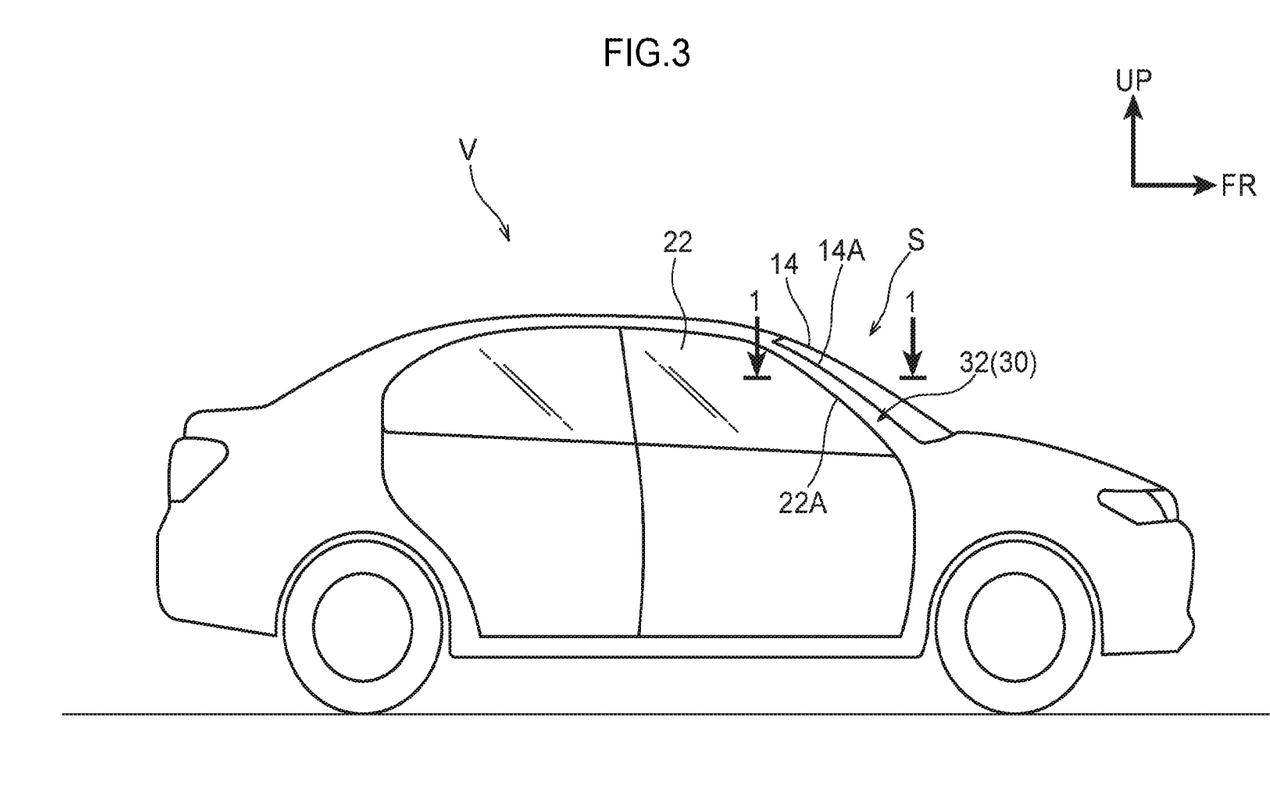
FIG. 3 is a side view as seen from the right-hand side showing the entire vehicle shown in FIG. 2.
Figure 4:
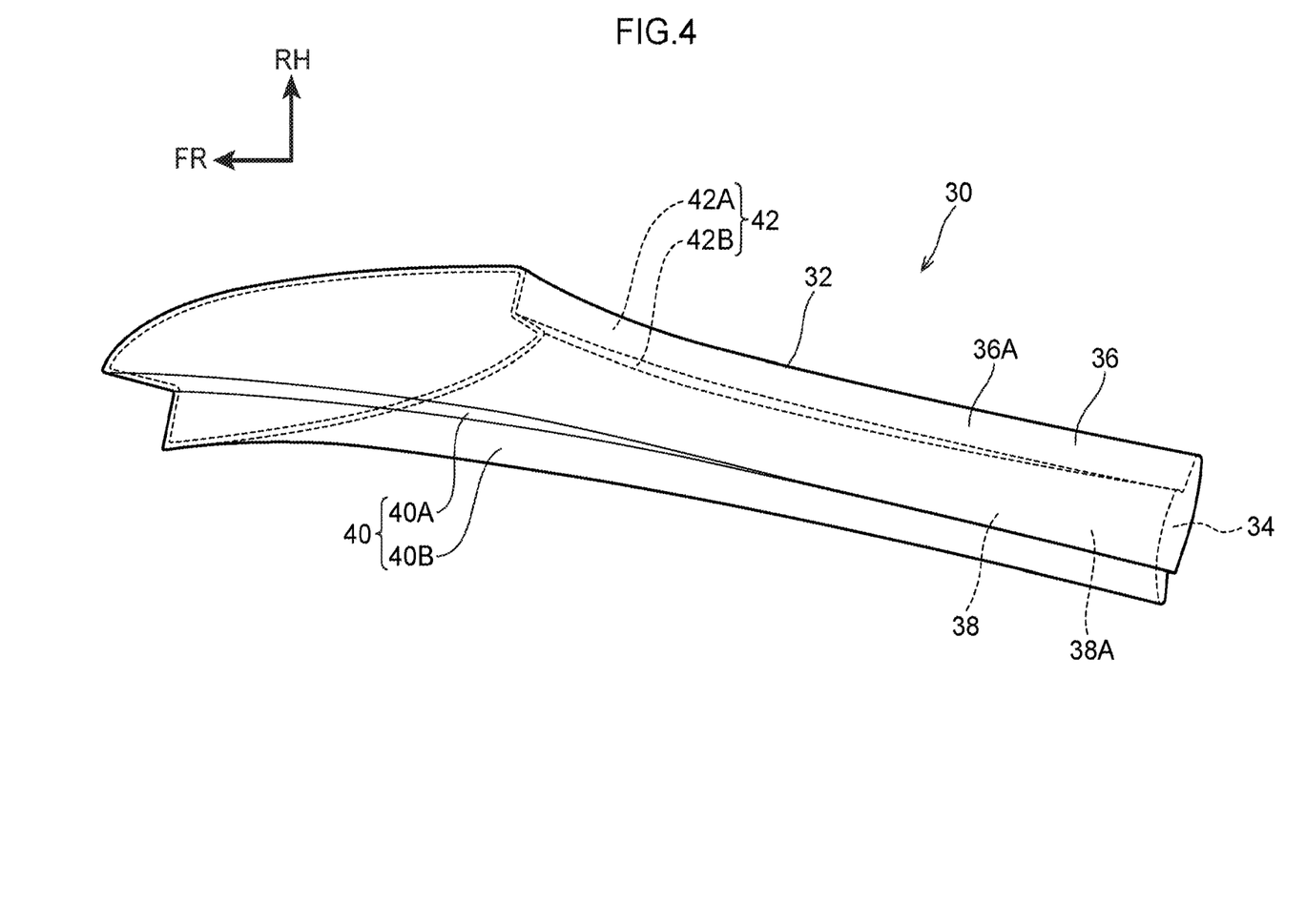
FIG. 4 is a plan view as seen from the vehicle upper side showing an enlargement of a front pillar on the vehicle right side shown in FIG. 3.

Moreover, as is shown in FIG. 3, a side door glass 22 that is formed in a transparent plate shape is provided at a side portion of the cabin C. Each front pillar 30 is located between a front end portion 22A of the side door glass 22 and the vehicle transverse direction outer side end portion 14A of the windshield glass 14.

Next, the front pillar 30 will be described. As is shown in FIG. 2, one front pillar 30 is provided on each side in the vehicle transverse direction of the windshield glass 14. The vehicle pillar structure S1 of the present exemplary embodiment is used in the front pillar 30 on the driver's seat side (i.e., the right-hand side). Because of this, in the following description, principally, the right-hand side front pillar 30 is described.

The front pillar 30 is made from resin. The front pillar 30 has the pillar portion 32 (see FIG. 4 through FIG. 6) which is formed in a hollow column shape, and the pillar portion 32 is disposed on the outer side in the vehicle transverse direction of the windshield glass 14, and extends in parallel with the vehicle transverse direction outer side end portion 14A of the windshield glass 14. An upper end portion of the pillar portion 32 is fixed via a bracket or the like to the front header 20. A lower end portion of the pillar portion 32 is fixed to an upper end portion of a front pillar lower member (not shown in the drawings) that is made from metal and extends in a substantially up-down direction.

As is described above, the pillar portion 32 extends in parallel with the vehicle transverse direction outer side end portion 14A of the windshield glass 14. Because of this, when seen in a side view, the pillar portion 32 is disposed such that it slopes towards the rear as it moves upwards. The pillar portion 32 is disposed on a front side and an outer side (i.e., the right side) in the vehicle transverse direction of the driver P. As a consequence, the view of the driver P towards the front side and the outer side in the vehicle transverse direction relative to the pillar portion 32 is obstructed by the pillar portion 32, however, as is described below, because the pillar portion 32 is constructed using a transparent resin material, the vehicle occupant P is able to view a vehicle exterior side through the pillar portion 32.

Figure 1:
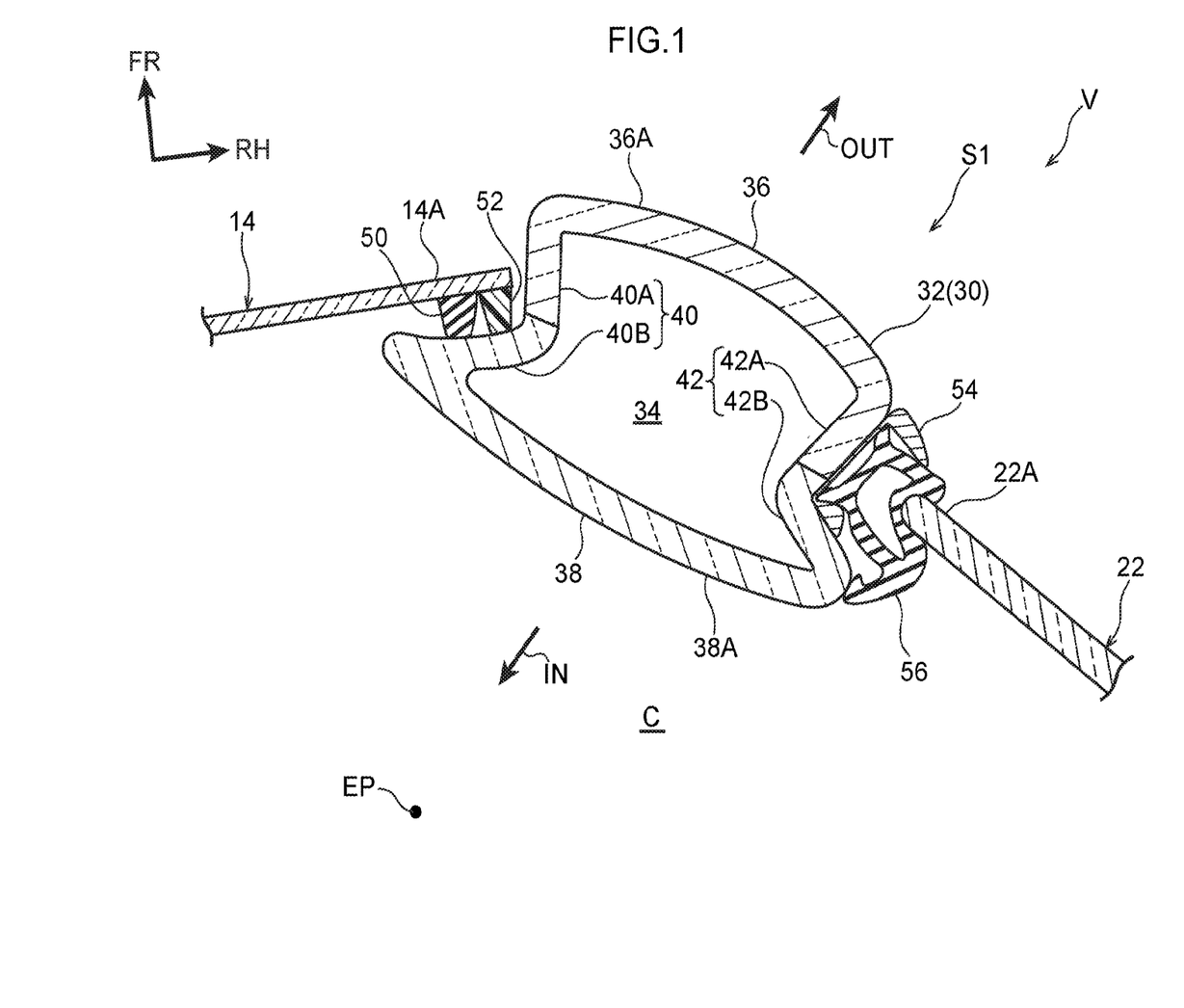
FIG. 1 is a planar cross-sectional view (taken along a line 1-1 in FIG. 3) as seen from a vehicle upper side showing a pillar portion of a front pillar to which a vehicle pillar structure according to a first exemplary embodiment is applied.

As is shown in FIG. 1, in a planar cross-sectional view, the pillar portion 32 is formed as a hollow structure 34 having a substantially elliptical cross section shape, and a longitudinal direction of the elliptical cross section shape is substantially parallel with the vehicle transverse direction. The surface area of the hollow structure 3 is formed such that it becomes gradually larger as it moves towards a lower end side (i.e., a front end side) of the pillar portion 32 (see FIG. 4 through FIG. 6). Moreover, the pillar portion 32 is formed so as to include an outer side wall 36 that forms a wall portion on the vehicle exterior side of the pillar portion 32, and an inner side wall 38 that forms a wall portion on the cabin C side of the pillar portion 32. The pillar portion 32 also has a first side wall 40 and a second side wall 42 serving as a pair of 'side walls' that link the outer side wall 36 and the inner side wall 38. In the present exemplary embodiment, apart from a boundary portion between the inner side wall 38 and the first side wall 40, the plate thickness of the pillar portion 32 is set to a uniform plate thickness of 5 mm, as an example.

In a planar cross-sectional view, the outer side wall 36 is formed in a curved shape that bulges slightly towards the vehicle exterior side, more specifically, diagonally towards the front and right-hand sides. On the other hand, in the planar cross-sectional view, the inner side wall 38 is formed in a curved shape that bulges slightly towards the cabin C side, more specifically, diagonally towards the rear and left-hand sides. The radius of curvature of each of the outer side wall 36 and the inner side wall 38 is set such that it becomes gradually larger as it moves towards the lower end side and the front end side of the pillar portion 32.

The first side wall 40 that forms an inner side in the vehicle transverse direction of the pillar portion 32, in other words, the windshield glass 14 side of the pillar portion 32 is formed substantially in an inverted L shape, when seen in a planar cross-section, that is open on the front side and on the inner side in the vehicle transverse direction of the L shape. The first side wall 40 protrudes towards an inner side of the hollow structure 34 of the pillar portion 32 relative to inner side ends in the vehicle transverse direction of the outer side wall 36 and the inner side wall 38. Moreover, a first outer side wall 40A that forms a portion of the first side wall 40 on the vehicle exterior side is connected to the outer side wall 36, while a first inner side wall 40B that forms a portion of the first side wall 40 on the cabin C side is connected to the inner side wall 38. The first outer side wall 40A is disposed at an outer side in the vehicle transverse direction of the windshield glass 14 and, in a planar cross-sectional view, a plate thickness direction of the first outer side wall 40A is orthogonal to a plate thickness direction of the windshield glass 14. In other words, the first outer side wall 40A is disposed substantially in parallel with an end surface of the vehicle transverse direction outer side end portion 14A of the windshield glass 14. In contrast, the first inner side wall 40B is disposed on the cabin C side of the vehicle transverse direction outer side end portion 14A of the windshield glass 14, and is disposed so as to face the windshield glass 14 in the plate thickness direction of the windshield glass 14.

An adhesive agent 50 such as a urethane sealant is coated directly onto a surface of the first inner side wall 40B that faces the windshield glass 14, and the vehicle transverse direction outer side end portion 14A of the windshield glass 14 is held at the first inner side wall 40B via the adhesive agent 50. The adhesive agent 50 is able to expand and contract elastically and, in addition to providing a seal between the windshield glass 14 and the front pillar 30, uses its elasticity to absorb expansion and contraction differences between the windshield glass 14 and the front pillar 30 that are caused by changes in temperature. Furthermore, a molding 52 is disposed at a position on the outer side in the vehicle transverse direction relative to the adhesive agent 50 between the outer side end portion 14A of the windshield glass 14 and the first inner side wall 40B. The gap that exists between the windshield glass 14 and the first inner side wall 40B is filled by the molding 52.

The second side wall 42 that forms an outer side in the vehicle transverse direction of the pillar portion 32, in other words, a side door glass 22 side of the pillar portion 32 is formed substantially in an L shape, when viewed from the longitudinal direction of the pillar portion 32, that is open on the rear side and on the outer side in the vehicle transverse direction of the L shape. The second side wall 42 protrudes towards the inner side of the hollow structure 34 of the pillar portion 32 relative to the outer side ends in the vehicle transverse direction of the outer side wall 36 and the inner side wall 38. Moreover, a second outer side wall 42A that forms a portion of the second side wall 42 is connected to the outer side wall 36, while a second inner side wall 42B that forms a portion of the second side wall 42 is connected to the inner side wall 38.

A retainer 54 that is formed by bending belt-shaped stainless steel or the like is provided at the second side wall 42. In a planar cross-sectional view, the retainer 54 is formed substantially in a U shape that is open to the rear side and the outer side in the vehicle transverse direction. A bottom wall of the retainer 54 is fixed by means of fastening components such as screws or the like (not shown in the drawings) to the second outer side wall 42A. A door seal 56 is fitted in the retainer 54. The door seal 56 is formed from a resilient material such as ethylene propylene rubber (EPDM). As a consequence, a structure is created in which the door seal 56 is held in the second side wall 42 via the retainer 54, and the front end portion 22A of the side door glass 22 is held at the second side wall 42 via the door seal 56.

Here, the front pillar 30 is formed from transparent resin, in the present exemplary embodiment, the front pillar 30 is made from glass fiber-reinforced resin, such as glass fiber-reinforced polycarbonate. More specifically, an outer side portion of front pillar 30, namely, the outer side wall 36, the first outer side wall 40A, and the second outer side wall 42A except for a connection portion of the second outer side wall 42A connected to the second inner side wall 42B, are formed from glass fiber-reinforced resin having a glass fiber content of 20%. On the other hand, an inner side portion of the front pillar 30, namely, the inner side wall 38, the first inner side wall 40B, the second inner side wall 42B, and the connection portion of the second outer side wall 42A that are connected to the second inner side wall 42B are formed from glass fiber-reinforced resin having a glass fiber content of 30%. As a consequence, in the pillar portion 32, the tensile strength of the outer side wall 36 is set lower than the tensile strength of the inner side wall 38. Note that, in FIG. 1, in order to make boundary portions between the outer side portion and the inner side portion of the pillar portion 32 easier to distinguish, these boundary portions are shown as a solid line.

Moreover, as is described above, because the front pillar 30 is formed from transparent resin, the entirety of each of the outer side wall 36 and the inner side wall 38 are formed as transparent portions. The outer side wall 36 defines an outer side transparent portion 36A, while the inner side wall 38 defines an inner side transparent portion 38A. Moreover, as is described above, the front pillar 30 is formed such that the driver P is able to view the vehicle exterior side through the pillar portion 32. Because of this, the outer side transparent portion 36A and the inner side transparent portion 38A overlap each other when viewed by the driver P.

Namely, as is shown in FIG. 2, an eye point EP of the driver P is a center point on a line that connects together both eyes of the driver P, and in a planar cross-sectional view at the position of the center point, the outer side transparent portion 36A and the inner side transparent portion 38A are disposed facing each other in a direction in which the eye point EP and the pillar portion 32 are facing each other (see the direction of an arrow OUT and the direction of an arrow IN in FIG. 1). As a consequence, a structure is created in which the driver P is able to view the vehicle exterior side through the pillar portion 32, specifically, through a portion of the pillar portion 32 that is located between the molding 52 and the retainer 54. Note that the position of the eye point EP of the driver P is set based on the position of the eye point EP of a dummy when the dummy is seated at the vehicle seat 10 in a driving posture. The dummy is, as an example, an AM50 dummy which covers a range of 50% of the body shapes of European male body types starting from the smallest. The planar cross-sectional view shown in FIG. 1 is taken at a position of the eye point EP of the driver P. Furthermore, the transmittance of the outer side wall 36 (i.e., the outer side transparent portion 36A) and the inner side wall 38 (i.e., the inner side transparent portion 38A) may be set, as an example, to 50% or more so that the driver P is able to view the vehicle exterior side through the pillar portion 32.

Next, actions and effects of the vehicle pillar structure S1 according to the present exemplary embodiment will be described.

In the vehicle pillar structure S1 having the above-described structure, the front pillar 30 has the pillar portion 32, and the pillar portion 32 extends in parallel with the vehicle transverse direction outer side end portion 14A of the windshield glass 14. As a consequence, because the pillar portion 32 is disposed forwards and to the outer side in the vehicle transverse direction from the driver P, the field of view of the driver P forwards and to the outer side in the vehicle transverse direction is obstructed by the pillar portion 32.

To counter this, the pillar portion 32 is formed from transparent resin. Moreover, the outer side wall 36 and the inner side wall 38 are disposed such that they overlap each other as seen by the driver P. Because of this, the driver P is able to view the vehicle exterior side through the pillar portion 32.

The pillar portion 32 is formed as the hollow structure 34. Moreover, the pillar portion 32 is formed so as to include the outer side wall 36 which forms the wall portion on the vehicle exterior side of the pillar portion 32, the inner side wall 38 which forms the wall portion on the cabin C side of the pillar portion 32, and the first side wall 40 and second side wall 42 which link the outer side wall 36 and the inner side wall 38. As a consequence, compared with when the pillar portion 32 is formed as a solid body, it is possible to achieve a reduction in the weight of the front pillar 30.

Figure 5:
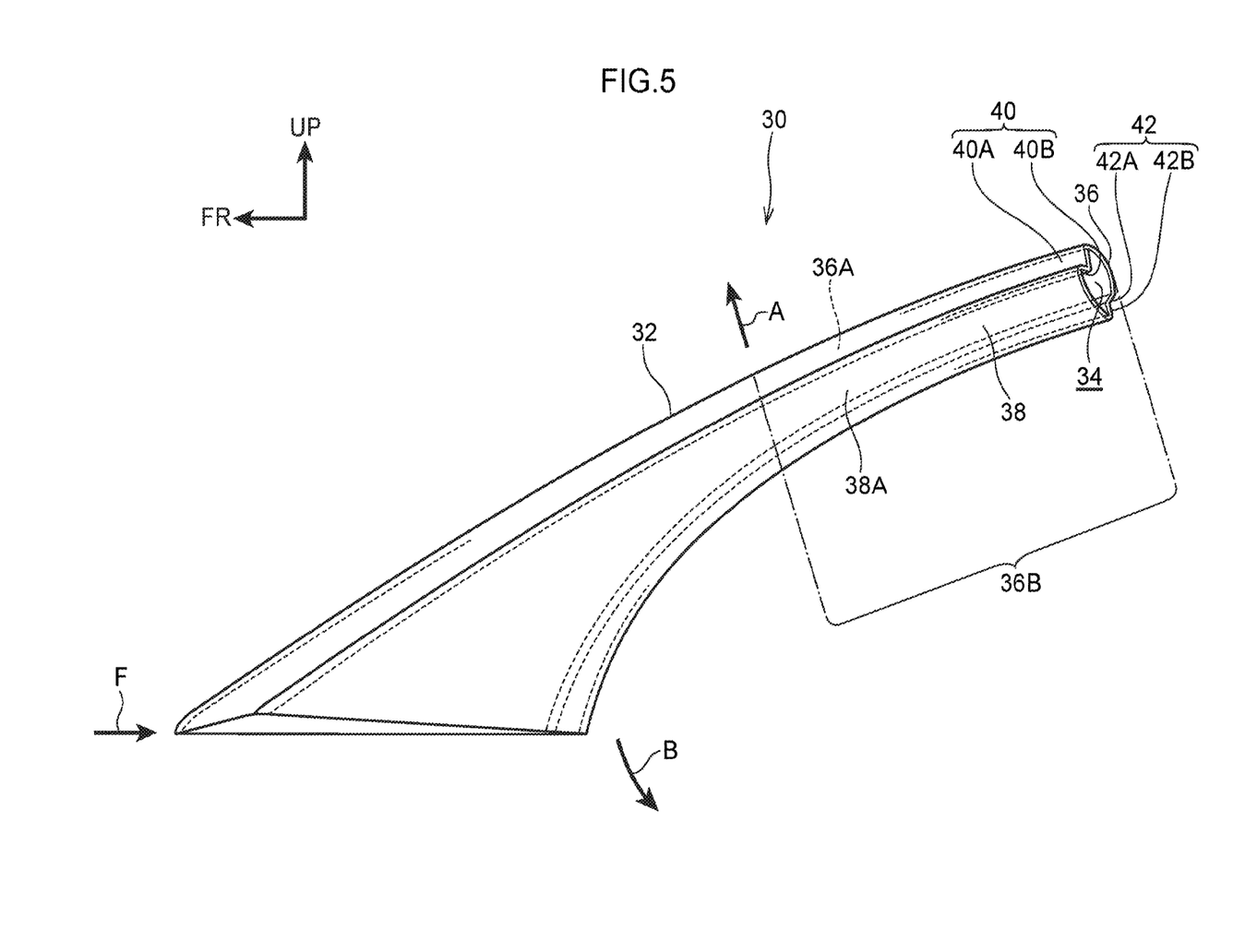
FIG. 5 is a side view as seen from a central side in the vehicle transverse direction showing the front pillar shown in FIG. 4.

Next, a deformation of the front pillar 30 during a frontal collision of the vehicle V will be described. As is shown in FIG. 5, when the vehicle V is in a frontal collision, an offset collision, or a small overlap collision which is another aspect of the offset collision, a collision load F that is applied toward vehicle rear side is input into the pillar 32 from a front end portion (i.e., a lower end portion) of the pillar portion 32. In addition, the pillar portion 32 is disposed such that, in a vehicle side view, it slopes towards the rear as it moves towards the upper side, and a rear end portion (i.e., an upper end portion) of the pillar portion 32 is fixed via a bracket or the like to the front header 20 of the vehicle body. Because of this, when the vehicle V is in a frontal collision, a front end portion of the pillar portion 32 is displaced toward the rear side, and an intermediate portion in the longitudinal direction of the pillar portion 32 is bent such that the intermediate portion protrudes towards the vehicle exterior side (i.e., in the direction shown by the arrow A in FIG. 5). Specifically, in the right-hand side pillar portion 32, when viewed from the central side in the vehicle transverse direction of the vehicle V, the front end portion of the pillar portion 32 is displaced such that it rotates anti-clockwise around the rear end portion of the pillar portion 32 in the direction shown by the arrow B in FIG. 5, and the intermediate portion in the longitudinal direction of the pillar portion 32 is bent such that it protrudes diagonally upwards and forward. Accordingly, tensile force towards the outer side is applied to the outer side wall 36 along the longitudinal direction thereof, and compression force towards the inner side is applied to the inner side wall 38 along the longitudinal direction thereof. Note that an offset collision is a frontal collision in which the overlap ratio in the vehicle transverse direction of the vehicle with a collision object is 40%, and a small overlap collision is a frontal collision in which the overlap ratio in the vehicle transverse direction of the vehicle with a collision object is 25% or less.

Here, in the pillar portion 32, the tensile strength of the outer side wall 36 is set lower than the tensile strength of the inner side wall 38. Because of this, it is possible to make the outer side wall 36 easier to bend and to make the inner side wall 38 more difficult to bend in response to the forces acting on the pillar portion 32 during a frontal collision of the vehicle V. As a result, when the vehicle V is in a frontal collision, primarily, the outer side wall 36 is bent while the bending of the inner side wall 38 is suppressed. In other words, it is possible to control the bending of the pillar portion 32 as a whole. Moreover, in the pillar portion 32, because the bending of the inner side wall 38 that forms the cabin C side is suppressed, it is possible to secure an excellent protection performance for a the driver P during a frontal collision. As a result of the above, it is possible to ensure a superior protection performance for the driver P (i.e., for a vehicle occupant) when the vehicle V is in a frontal collision, while also achieving visibility for the driver P through the front pillar 30, and achieving a reduction in weight of the front pillar 30.

Moreover, the pillar portion 32 is formed from transparent glass fiber-reinforced resin. Because of this, it is possible to increase the tensile strength of the entire pillar portion 32. Furthermore, the glass fiber content in the glass fiber-reinforced resin forming the outer side wall 36 is set to be less than the glass fiber content in the glass fiber-reinforced resin forming the inner side wall 38. Because of this, the tensile strength of the outer side wall 36 can be set lower than the tensile strength of the inner side wall 38 by means of a simple structure.

Second embodiment

Next, a front pillar 60 to which a vehicle pillar structure S2 according to a second exemplary embodiment is applied will be described using FIG. 7 and FIG. 8. The front pillar 60 of the second exemplary embodiment is constructed in the same way as the front pillar 30 of the first exemplary embodiment except for in the following points. Note that, component elements of the front pillar 60 described below that are formed in the same way as in the first exemplary embodiment are given the same reference numerals.

Figure 7:
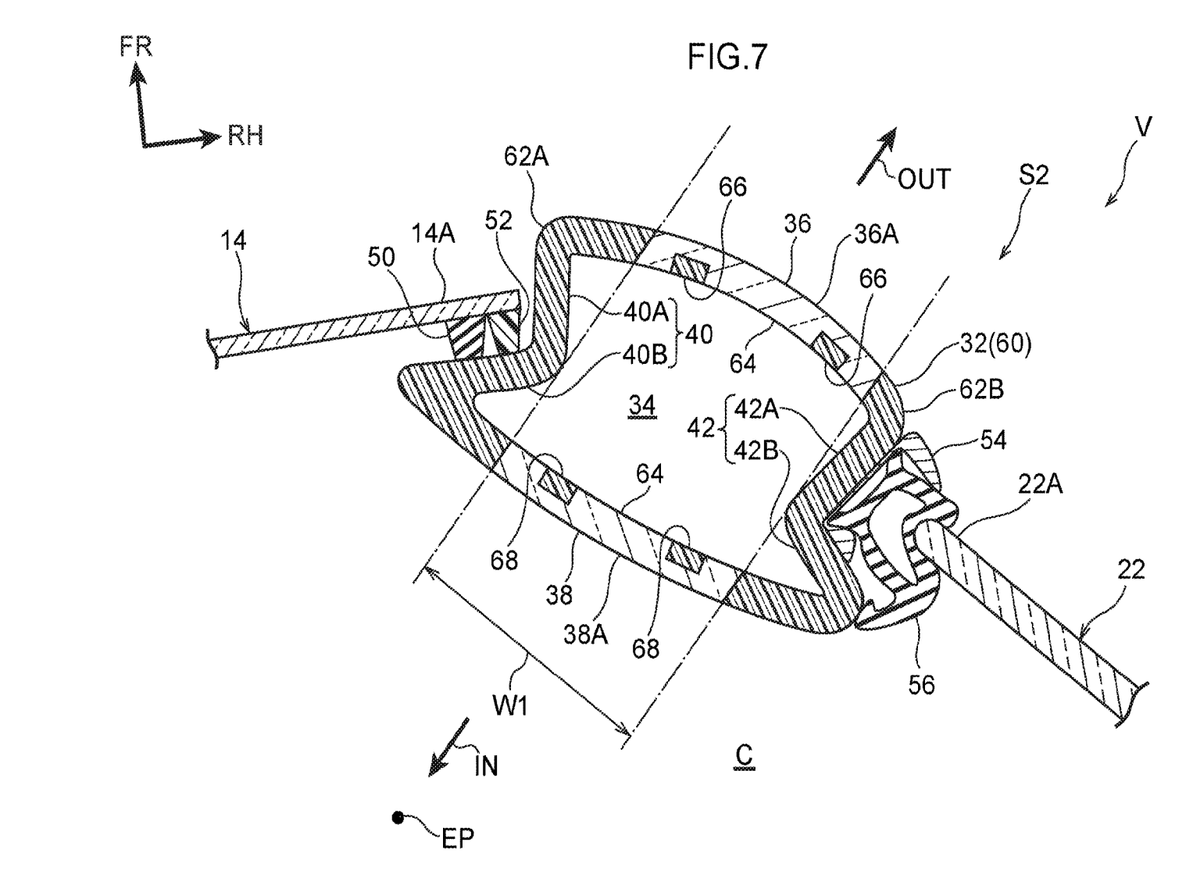
FIG. 7 is a planar cross-sectional view corresponding to FIG. 1 showing a pillar portion of a front pillar to which a vehicle pillar structure according to a second exemplary embodiment is applied.

Namely, as is shown in FIG. 7, in the front pillar 60 of the second exemplary embodiment, a side portion 62A on one side in the transverse direction of the pillar portion 32, more specifically, the first side wall 40, an inner side end portion in the vehicle transverse direction of the outer side wall 36, and an inner side end portion in the vehicle transverse direction of the inner side wall 38 are formed from black carbon fiber-reinforced resin. In addition, a side portion 62B on the other side in the transverse direction of the pillar portion 32, more specifically, the second side wall 42, an outer side end portion in the vehicle transverse direction of the outer side wall 36, and an outer side end portion in the vehicle transverse direction of the inner side wall 38 are formed from the same black carbon fiber-reinforced resin that is used to form the side portion 62A. This carbon fiber-reinforced resin is formed having a higher tensile strength and flexural strength than the glass fiber-reinforced resin that is used to form the outer side transparent portion 36A and the inner side transparent portion 38A.

As a consequence, in the outer side wall 36, portions other than the two end portions in the transverse direction of the outer side wall 36 form the outer side transparent portion 36A, while, in the inner side wall 38, portions other than the two end portions in the transverse direction of the inner side wall 38 form the inner side transparent portion 38A. In other words, in the second exemplary embodiment, a portion of the outer side wall 36 forms the outer side transparent portion 36A, while a portion of the inner side wall 38 forms the inner side transparent portion 38A. In addition, in the same way as in the first exemplary embodiment, the inner side transparent portion 38A and the outer side transparent portion 36A are disposed such that they overlap each other when viewed by the driver P. Moreover, in a planar cross-sectional view at the position of the eye point EP of the driver P, a width dimension W1 of the outer side transparent portion 36A and the inner side transparent portion 38A is set, as an example, to 65 mm. The width dimension W1 is a dimension taken in a direction running orthogonal to a facing direction in which the eye point EP of the driver P and the pillar portion 32 are facing each other.

Outer side beams 66 are formed integrally with the outer side wall 36. These outer side beams 66 span distances between the side portion 62A and the side portion 62B of the pillar portion 32. In other words, the outer side beams 66 are suspended between the first side wall 40 and the second side wall 42 via the two end portions in the transverse direction of the outer side wall 36. Furthermore, inner side beams 68 are formed integrally with the inner side wall 38. These inner side beams 68 span distances between the side portion 62A and the side portion 62B of the pillar portion 32. In other words, the inner side beams 68 are suspended between the first side wall 40 and the second side wall 42 via the two end portions in the transverse direction of the inner side wall 38. The outer side beams 66 and the inner side beams 68 are formed from the same black (i.e., non-transparent) carbon fiber-reinforced resin that is used to form the side portion 62A and the side portion 62B of the pillar portion 32. Hereinafter, the outer side beams 66 and the inner side beams 68 will be described.

Figure 8A:
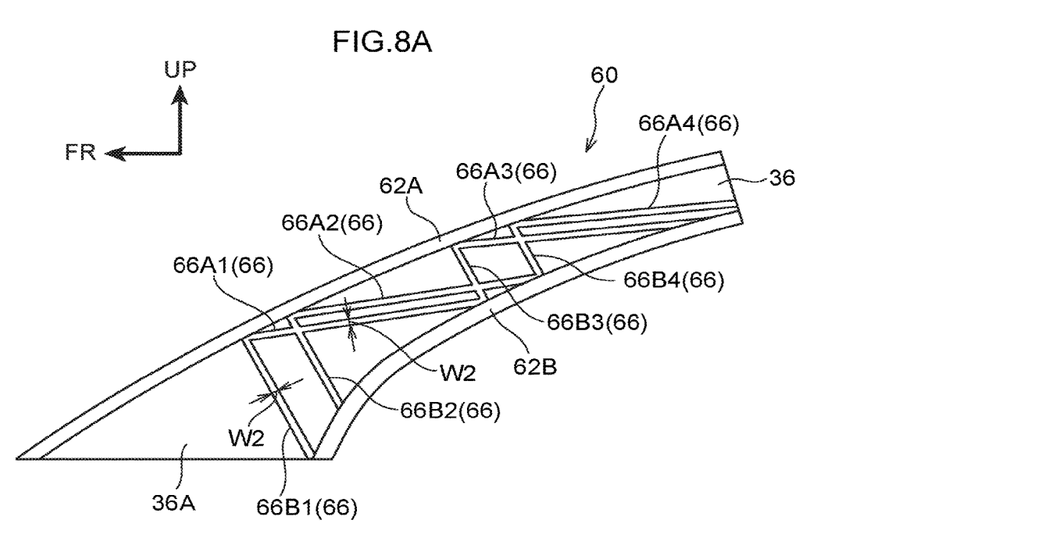
FIG. 8A is a schematic side view as seen from a central side in the vehicle transverse direction illustrating outer side beams that are formed on an outer side wall shown in FIG. 7.

As is shown in FIG. 8A, the outer side beams 66 are constructed so as to include plural (four in the present exemplary embodiment) first outer side beams 66A1 through 66A4, and second outer side beams 66B1 through 66B4 that correspond respectively to the first outer side beams 66A1 through 66A4. Namely, four second outer side beams 66B1 through 66B4 are formed. When seen in a vehicle side view, end portions of the first outer side beams 66A1 through 66A4 that are connected to the side portion 62A of the pillar portion 32 are taken as respective base end portions of the first outer side beams 66A1 through 66A4, and the first outer side beams 66A1 through 66A4 each extends from the respective base end portion diagonally upwards towards the upper end side of the pillar portion 32 to reach the side portion 62B. In addition, the first outer side beams 66A1 through 66A4 are arranged at predetermined intervals from each other in the longitudinal direction of the pillar portion 32.

The second outer side beams 66B1 through 66B4 each extends from the base end portion of the corresponding first outer side beam among the first outer side beams 66A1 through 66A4 to the side portion 62B. Namely, the second outer side beams 66B1 through 66B4 extend substantially in the transverse direction of the outer side wall 36. As a consequence, when seen in a vehicle side view, the second outer side beams 66B1 through 66B4 respectively extend in directions that intersect the first outer side beams 66A1 through 66A4, and are arranged at predetermined intervals from each other in the longitudinal direction of the pillar portion 32 so as to correspond to the first outer side beams 66A1 through 66A4. Moreover, a distal end of the second outer side beam 66B3 that is disposed third from the lower end side of the pillar portion 32 is connected to a distal end of the first outer side beam 66A1, and a distal end of the second outer side beam 66B4 that is disposed fourth from the lower end side of the pillar portion 32 is connected to a distal end of the first outer side beam 66A2. As a consequence, of the outer side beams 66, the first outer side beam 66A1 and the second outer side beam 66B2 intersect each other, the first outer side beam 66A2 and the second outer side beam 66B3 intersect each other, and the first outer side beam 66A3 and the second outer side beam 66B4 intersect each other. In other words, of the outer side beams 66, apart from the second outer side beam 66B1 and the first outer side beam 66A4, each of the first outer side beams is disposed so as to intersects with any one of the second outer side beams that is located at upper side of and adjacent to each of the first outer side beams of the pillar portion 32.

Moreover, as is shown in FIG. 7, the outer side beams 66 (i.e., the first outer side beams 66A1 through 66A4 and the second outer side beams 66B1 through 66B4) each is formed having a substantially rectangular-shaped cross-section when viewed from the longitudinal direction thereof. Furthermore, the outer side beams 66 are embedded in an inner circumferential side (i.e., the hollow structure 34 side) portion of the outer side wall 36 such that surfaces on the hollow structure 34 side of the respective outer side beams 66 are flush with the inner circumferential surface of the outer side wall 36.

Figure 8B:
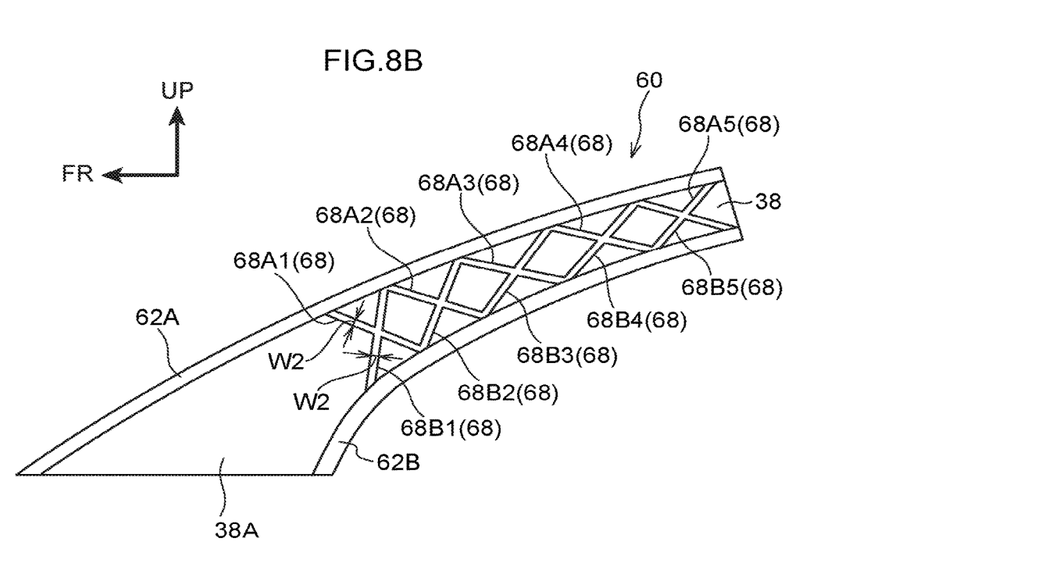
FIG. 8B is a schematic side view as seen from a central side in the vehicle transverse direction illustrating inner side beams that are formed on an inner side wall shown in FIG. 7.

As is shown in FIG. 8B, the inner side beams 68 are constructed so as to include plural (five in the present exemplary embodiment) first inner side beams 68A1 through 68A5, and plural (five in the present exemplary embodiment) second inner side beams 68B1 through 68B5. Namely, the number of the above-described outer side beams 66 is less than the number of inner side beams 68.

When seen in a vehicle side view, end portions of the first inner side beams 68A1 through 68A5 that are connected to the side portion 62A of the pillar portion 32 are taken as respective base end portions of the first inner side beams 68A1 through 68A5, and the first inner side beams 68A1 through 68A5 each extends from the respective base end portion diagonally upwards towards the upper end side of the pillar portion 32 to reach the side portion 62B. In addition, the first inner side beams 68A1 through 68A5 are arranged at predetermined intervals from each other in the longitudinal direction of the pillar portion 32.

Each one of the second inner side beams 68B1 through 68B5 is set so as to form a pair with any one of the first inner side beams 68A1 through 68A5, and the pairs of second inner side beams 68B1 through 68B5 and first inner side beams 68A1 through 68A5 intersect each other substantially in an X shape. Specifically, when seen in a vehicle side view, end portions of the second inner side beams 68B1 through 68B5 that are connected to the side portion 62A of the pillar portion 32 are taken as respective base end portions of the second inner side beams 68B1 through 68B5, and the second inner side beams 68B1 through 68B5 each extends from the respective base end portion diagonally downwards towards the lower end side of the pillar portion 32 to reach the side portion 62B. As a consequence, when seen in a vehicle side view, the second inner side beams 68B1 through 68B5 extend in directions that intersect the first inner side beams 68A1 through 68A5. In addition, the respective pairs of first inner side beams 68A1 through 68A5 and second inner side beams 68B1 through 68B5 are arranged adjacently to each other in the longitudinal direction of the inner side wall 38.

Moreover, as is shown in FIG. 7, the inner side beams 68 (i.e., the first inner side beams 68A1 through 68A5 and the second inner side beams 68B1 through 68B5) each is formed having a substantially rectangular-shaped cross-section when viewed from the longitudinal direction thereof. Furthermore, the inner side beams 68 are embedded in a portion at an inner circumferential side (i.e., the hollow structure 34 side) of the inner side wall 38 such that surfaces on the hollow structure 34 side of the respective inner side beams 68 are flush with the inner circumferential surface of the inner side wall 38.

Furthermore, respective width dimensions W2 of the outer side beams 66 and the inner side beams 68 are set to the same dimension. Moreover, respective thickness dimensions of the outer side beams 66 and the inner side beams 68 are also set to the same dimension. Namely, the cross-sectional shapes as seen from the longitudinal direction of the outer side beams 66 and the inner side beams 68 are set to the same configuration. In addition, the respective width dimension W2 of each of the outer side beams 66 and the inner side beams 68 is set such that, when the driver P is viewing the vehicle exterior side through the outer side transparent portion 36A and the inner side transparent portion 38A, each of the outer side beams 66 and the inner side beams 68 does not obstruct the ability of the driver P to view the vehicle exterior side. For example, the width dimension W2 may be set to 6 mm. Moreover, as is shown in FIG. 8A and FIG. 8B, the length of each of the first outer side beams 66A1 through 66A4 is set longer than the respective lengths of the second outer side beams 66B1 through 66B4, the first inner side beams 68A1 through 68A5, and the second inner side beams 68B1 through 68B5. As a consequence, compared to the inner side beams 68, the first outer side beams 66A1 through 66A4 are disposed so as to be substantially parallel with the longitudinal direction of the pillar portion 32.

Moreover, the outer side beams 66 and the inner side beams 68 are set using a method such as topology analysis. In the second exemplary embodiment, the tensile strength of the outer side wall 36 is set lower than the tensile strength of the inner side wall 38, and the flexural strength of the outer side wall 36 is set lower than the flexural strength of the inner side wall 38. As a consequence, in the second exemplary embodiment as well, the same operational effects can be obtained as those obtained from the first exemplary embodiment.

Moreover, in the second exemplary embodiment, the plurality of outer side beams 66 are provided integrally with the outer side wall 36, and the outer side beams 66 are suspended between the first side wall 40 and the second side wall 42. Furthermore, the plurality of inner side beams 68 are provided integrally with the inner side wall 38, and the inner side beams 68 are suspended between the first side wall 40 and the second side wall 42. In addition, the outer side beams 66 and the inner side beams 68 are formed from carbon fiber-reinforced resin. As a consequence, the overall flexural strength of the pillar portion 32 can be set high by using the outer side beams 66 and the inner side beams 68.

Furthermore, the number of outer side beams 66 is set to fewer than the number of inner side beams 68. Because of this, the flexural strength of the outer side wall 36 can be set lower than the flexural strength of the inner side wall 38. As a consequence, when the vehicle V is in a frontal collision, it is possible to increase the overall flexural strength of the pillar portion 32 by using the outer side beams 66 and the inner side beams 68 while maintaining the structure of the pillar portion 32 in which the outer side wall 36 bends easily while the inner side wall 38 only bends with difficulty.

Moreover, the length of each of the first outer side beams 66A1 through 66A4 is set longer than the respective lengths of the second outer side beams 66B1 through 66B4, the first inner side beams 68A1 through 68A5, and the second inner side beams 68B1 through 68B5. Because of this, compared to the inner side beams 68, the first outer side beams 66A1 through 66A4 are disposed so as to be substantially parallel with the longitudinal direction of the pillar portion 32. As a consequence, the first outer side beams 66A1 through 66A4 are arranged such that the tensile force resistance properties of the first outer side beams 66A1 through 66A4 can be utilized effectively with respect to tensile force that is applied to the outer side wall 36 in the event of a frontal collision. As a consequence, it is possible to suppress any extreme bending of the outer side wall 36 in the event, for example, of a frontal collision of the vehicle V.

Moreover, in the second exemplary embodiment, the first side wall 40 and the second side wall 42 are formed from carbon fiber-reinforced resin which has a higher tensile strength and a higher flexural strength than the outer side transparent portion 36A and the inner side transparent portion 38A. As a consequence, compared to the first exemplary embodiment, it is possible to increase the overall flexural strength of the pillar portion 32 by using the first side wall 40 and the second side wall 42. As a result, it is possible to make it even more difficult for the entire pillar portion 32 to bend and break when the vehicle V is in a frontal collision. Accordingly, it becomes possible to provide an even more effective protection performance for the driver P (i.e., for a vehicle occupant) when the vehicle V is in a frontal collision.

(Variant Example of the Pillar Portion 32)

Figure 6:
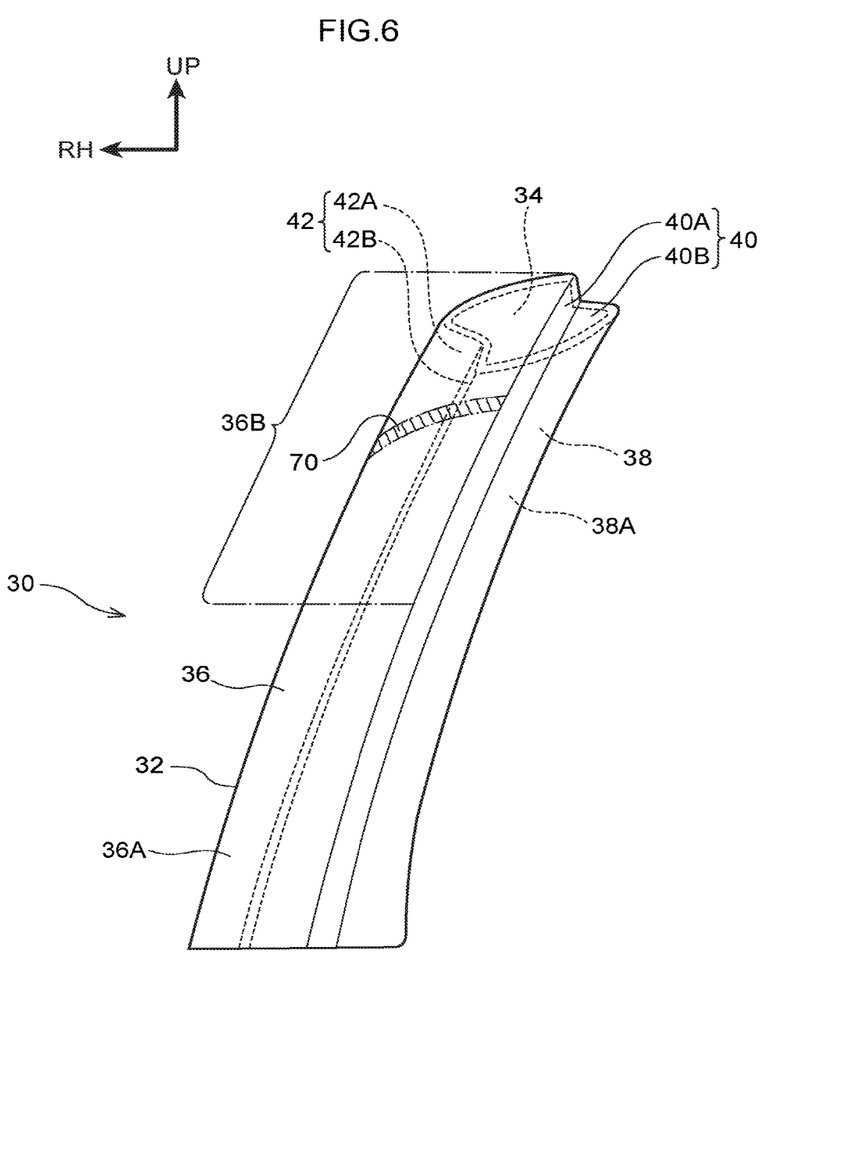
FIG. 6 is a front view as seen from the vehicle front side showing the front pillar shown in FIG. 4.

Next, a variant example of the pillar portion 32 as applied to the first exemplary embodiment will be described using FIG. 6. In the first exemplary embodiment and the second exemplary embodiment, the tensile strength of the outer side transparent portion 36A of the outer side wall 36 is set as uniform over the entire longitudinal direction of the pillar portion 32. In contrast to this, in the present variant example, a low-strength portion 70 (see the portion indicated by hatching in FIG. 6) is formed at an upper portion 36B of the outer side wall 36, namely, at a portion on an upper side from a central portion in the longitudinal direction of the pillar portion 32 (see FIG. 5 and FIG. 6). The tensile strength of this low-strength portion 70 is formed lower than the tensile strength of portions other than the low-strength portion 70 of the outer side wall 36.

The low-strength portion 70 is formed from glass fiber-reinforced resin having a glass fiber content of less than 20%, and extends in the transverse direction of the outer side wall 36. Furthermore, the low-strength portion 70 is set at a position that substantially matches the position of the head portion of the driver P in the up-down direction. The low-strength portion 70 is set at the position of the head portion of a dummy who is seated in the vehicle seat 10 using the aforementioned dummy (as an example, an AM50 dummy which covers a range of 50% of the body shapes of European male body types starting from the smallest).

In the present variant example, as is described above, because the tensile strength of the low-strength portion 70 is made lower than the tensile strength of portions other than the low-strength portion 70 of the outer side wall 36, when the vehicle V is in a frontal collision, the outer side wall 36 performs a bending action with the low-strength portion 70 as the bend starting point. As a consequence, in the pillar portion 32, there is a tendency for peripheral portions around the low-strength portion 70 to bend such that they protrude towards the vehicle exterior side.

In contrast, for example, in a small overlap collision or an offset collision on the right-hand side of the vehicle V, because of inertial force, the upper body portion of the driver P moves towards the vehicle front side and towards the outer side in the vehicle transverse direction (see an arrow C in FIG. 2). Namely, the head portion of the driver P moves towards the pillar portion 32. At this time, as is described above, in the pillar portion 32, peripheral portions surrounding the low-strength portion 70 bend such that they protrude towards the vehicle exterior side. The low-strength portion 70 is formed at the upper portion 36B of the outer side wall 36 of the pillar portion 32. As is described above, the position of the low-strength portion 70 in the up-down direction can be matched to the position of the head portion of the driver P. As a consequence, when the vehicle V is in an offset collision or a small overlap collision, the bending portion of the pillar portion 32 can be made to move away from the head portion of the driver P which is displaced towards the pillar portion 32. As a result, any collision between the head portion of the driver P and the pillar portion 32 can be reduced. Accordingly, it is possible to improve the protection performance for the head portion of the driver P (i.e., of a vehicle occupant) in an offset collision and in a small overlap collision of the vehicle V.

Moreover, in the present variant example, the low-strength portion 70 is formed from glass fiber-reinforced resin having a glass fiber content of less than 20%. It is possible to provide the low-strength portion 70 at the outer side wall 36 while maintaining the design aspect of the pillar portion 32. Namely, by forming, for example, slits or notches at the outer circumferential surface (i.e., the design surface) of the outer side wall 36 instead of the low-strength portion 70, then in the event of a frontal collision of the vehicle V, these slits or notches can be made to function as the bend starting point for the outer side wall 36. However, because the outer circumferential surface of the pillar portion 32 forms the design surface of the vehicle V, the design aspect of the vehicle V is affected. In contrast to this, in the present variant example, because the low-strength portion 70 is formed by reducing the content of glass fiber, the low-strength portion 70 can be provided at the outer side wall 36 without the design aspect of the pillar 32 being affected.

Note that, in the present variant example, the low-strength portion 70 is formed by reducing the glass fiber content however, the structure of the low-strength portion 70 is not limited to this. For example, it is also possible to form a recessed portion in an inner circumferential surface of the outer side wall 36, and to use the portion where the recessed portion is formed as the low-strength portion 70. Namely, the low-strength portion 70 can also be provided at the outer side wall 36 by thinning down the plate thickness of the location where the low-strength portion 70 is formed at the outer side wall 36. In this case, the low-strength portion 70 can be provided at the outer side wall 36 by means of a simple structure.

Moreover, in the first exemplary embodiment and second exemplary embodiment, the glass fiber content in the glass fiber-reinforced resin in the outer side wall 36 is set to 20%, and the glass fiber content in the glass fiber-reinforced resin in the inner side wall 38 is set to 30%, however, these content ratios can also be set to other desired ratios.

Moreover, in the first exemplary embodiment and the second exemplary embodiment, the tensile strength of the outer side wall 36 is formed lower than the tensile strength of the inner side wall 38 by setting the glass fiber contents of the respective glass fiber-reinforced resins to different ratios, however, the structure that is used to make the tensile strength of the outer side wall 36 lower than that of the inner side wall 38 is not limited to this. For example, it is also possible to make the tensile strength of the outer side wall 36 lower than that of the inner side wall 38 by forming the outer side wall 36 and the inner side wall 38 from the same transparent resin (for example, a glass fiber-reinforced resin having a glass fiber content of 30%), and setting the plate thickness of the outer side wall 36 thinner than the plate thickness of the inner side wall 38. It is also possible, for example, to make the tensile strength of the actual transparent resin used to form the outer side wall 36 lower than the tensile strength of the actual transparent resin used to form the inner side wall 38.

Moreover, in the first exemplary embodiment and the second exemplary embodiment, the outer side wall 36 and the inner side wall 38 are formed from glass-fiber reinforced resin, however, the material used to form the outer side wall 36 and the inner side wall 38 is not limited to this. For example, it is also possible to form the outer side wall 36 from a transparent resin containing no fibers, and to form the inner side wall 38 from a glass fiber-reinforced resin.

Moreover, in the first exemplary embodiment and the second exemplary embodiment, an example is described in which the vehicle pillar structures S1 and S2 are applied to the front pillar 30 on the driver's side, however, the application of the vehicle pillar structures S1 and S2 is not limited to the driver's side. For example, the vehicle pillar structures S1 and S2 may also be applied to the front pillar 30 on the passenger's side. In this case as well, it is possible to ensure a superior protection performance for a vehicle occupant who is sitting in the passenger side vehicle seat 12 when the vehicle V is in a frontal collision, while also securing visibility for the driver P through the front pillar 30, and achieving a reduction in weight. Furthermore, although not shown in the drawings, the vehicle pillar structures S1 and S2 may also be applied, for example, to a rear pillar that is located between rear windshield glass and side door glass of the cabin C. In this case, it is possible to suppress the bending and breaking of the whole rear pillar if the vehicle V is in a rear collision. As a consequence, it is possible to ensure a superior protection performance for a vehicle occupant in a rear collision, while also securing visibility for the driver P through the rear pillar, and achieving a reduction in weight of the rear pillars.

Moreover, in the present exemplary embodiment, the vehicle pillar structures S1 and S2 are applied to a right-hand drive vehicle V, however, the vehicle pillar structures S1 and S2 may also be applied to a left-hand drive vehicle.

What is claimed is:
1. A vehicle pillar structure comprising a pillar portion configured to extend in parallel with a vehicle transverse direction outer side end portion of a windshield glass and the pillar portion having a hollow structure, the pillar portion comprising:

an outer side wall forming a wall at a vehicle exterior side of the pillar portion;

an inner side wall forming a wall at a vehicle cabin side of the pillar portion; and a pair of side walls linking the outer side wall and the inner side wall, wherein:

at least a portion of the outer side wall is an outer side transparent portion that is formed from a transparent resin, at least a portion of the inner side wall is an inner side transparent portion that is formed from a transparent resin and, as viewed from a driver position, overlaps with the outer side transparent portion, and a tensile strength of the outer side wall is lower than a tensile strength of the inner side wall.

2. The vehicle pillar structure according to claim 1, wherein:

the outer side transparent portion and the inner side transparent portion are formed from glass fiber-reinforced resin, and a glass fiber content in the glass fiber-reinforced resin forming the outer side transparent portion is less than a glass fiber content in the glass fiber-reinforced resin forming the inner side transparent portion.

3. The vehicle pillar structure according to claim 1, wherein a low-strength portion, having lower tensile strength than other portions of the outer side wall, is provided at an upper portion in a pillar portion longitudinal direction of the outer side wall.

4. The vehicle pillar structure according to claim 1, wherein:

a plurality of outer side beams that are suspended between the pair of side walls are formed integrally with the outer side wall, a plurality of inner side beams that are suspended between the pair of side walls are formed integrally with the inner side wall, the outer side beams and the inner side beams are formed from carbon fiber-reinforced resin, and cross-sectional shapes of the outer side beams and the inner side beams are identical, while a number of the outer side beams is fewer than a number of the inner side beams.

5. The vehicle pillar structure according to claim 4, wherein:

the outer side beams include first outer side beams, and second outer side beams that, when seen in a vehicle side view, extend in a direction that intersects with the first outer side beams, the inner side beams include first inner side beams, and second inner side beams that, when seen in a vehicle side view, extend in a direction that intersects with the first inner side beams, and a length of the respective first outer side beams is longer than a length of each of the second outer side beams, the first inner side beams, and the second inner side beams.

* * * * *